United States Patent
Katayama

(10) Patent No.: US 9,926,425 B2
(45) Date of Patent: *Mar. 27, 2018

(54) METHOD FOR DEGRADING BIODEGRADABLE RESIN

(71) Applicant: TOYO SEIKAN GROUP HOLDINGS, LTD., Shinagawa-ku, Tokyo (JP)

(72) Inventor: Tsutaki Katayama, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,676

(22) Filed: Apr. 19, 2017

(65) Prior Publication Data

US 2017/0218163 A1    Aug. 3, 2017

Related U.S. Application Data

(63) Continuation of application No. 15/025,151, filed as application No. PCT/JP2014/075426 on Sep. 25, 2014, now Pat. No. 9,650,489.

(30) Foreign Application Priority Data

Sep. 27, 2013  (JP) .................................. 2013-202295
Sep. 27, 2013  (JP) .................................. 2013-202296

(51) Int. Cl.
*C08J 11/10*    (2006.01)
*B09B 3/00*    (2006.01)
*C12Q 1/37*    (2006.01)

(52) U.S. Cl.
CPC ............... *C08J 11/105* (2013.01); *B09B 3/00* (2013.01); *C08J 2300/16* (2013.01); *C08J 2367/04* (2013.01); *Y02W 30/702* (2015.05)

(58) Field of Classification Search
CPC .................. C08J 11/105; B09B 3/00
See application file for complete search history.

(56) References Cited

U.S. PATENT DOCUMENTS

| | | |
|---|---|---|
| 2005/0042709 A1 | 2/2005 | Yonehara et al. |
| 2010/0086718 A1 | 4/2010 | Yoshikawa et al. |
| 2011/0201069 A1 | 8/2011 | Yoshikawa et al. |
| 2012/0003678 A1 | 1/2012 | Aisaka et al. |
| 2013/0288322 A1 | 10/2013 | Yoshikawa et al. |
| 2014/0057333 A1 | 2/2014 | Aisaka et al. |
| 2014/0234886 A1 | 8/2014 | Aisaka et al. |
| 2015/0010974 A1 | 1/2015 | Yoshikawa et al. |

FOREIGN PATENT DOCUMENTS

| | | |
|---|---|---|
| JP | 2003-284550 A | 10/2003 |
| JP | 2005-162832 A | 6/2005 |
| JP | 2006-036899 A | 2/2006 |
| JP | 2006-087394 A | 4/2006 |
| JP | 2010-011876 A | 1/2010 |
| JP | 2010-138389 A | 6/2010 |
| JP | 2010-248516 A | 11/2011 |
| JP | 2013-000099 A | 1/2013 |
| WO | 2008/038648 A1 | 4/2008 |
| WO | 2010/041715 A1 | 4/2010 |

OTHER PUBLICATIONS

Japanese Patent Office, International Search Report in PCT/JP2014/075426, dated Jan. 6, 2015.
Japanese Patent Office, Written Opinion of the International Searching Authority in PCT/JP2014/075426, dated Jan. 6, 2015.
Office Action for Japanese Patent Application No. 2013-202295, dated Jun. 12 2017.
Office Action for Japanese Patent Application No. 2013-202296, dated Jun. 12 2017.
F. Kawai, et al., "Different enantioselectivity of two types of poly(lactic acid) depolymerases toward poly(L-lactic acid) and poly(D-lactic acid)", Polymer Degradation and Stability 96 (2011) pp. 1342-1348.
Y. Oda, et al., "Degradation of Polylactide by Commercial Proteases", Journal of Polymers and the Environment, vol. 8, No. 1, 2000, pp. 29-32.
Russian Office Action for Russian application No. 2016116270/05(025523) based on PCT Application No. PCT/JP2014/075426,dated Sep. 6, 2017.

*Primary Examiner* — Maryam Monshipouri
(74) *Attorney, Agent, or Firm* — Hoffmann & Baron, LLP

(57) ABSTRACT

An object of the present invention is to provide a method for efficiently degrading a biodegradable resin. In particular, the present invention relates to a method for degrading a biodegradable resin, the method comprising degrading the biodegradable resin in a buffer solution containing a biodegradable resin-degrading enzyme having an optimum pH of 7.5 or higher, wherein no anion derived from a buffer component is present on one side of an equilibrium equation of buffering of the buffer solution, and a pH of the buffer solution is adjusted within a pH range which gives conditions for shifting the equilibrium towards the side on which no anion is present. Further, the present invention relates to a method for degrading a biodegradable resin, the method comprising degrading the biodegradable resin in an enzymatic reaction liquid containing a biodegradable resin-degrading enzyme having an optimum concentration, wherein the degradation is conducted in a reaction liquid having an enzyme concentration which gives a biodegradable resin degradation ratio of 60% or higher, where a biodegradable resin degradation ratio at said optimum concentration is referred to as 100%.

4 Claims, 2 Drawing Sheets

DEGRADING ENZYME: Esperase

DEGRADING ENZYME: Proteinase K

METHOD FOR DEGRADING BIODEGRADABLE RESIN

CROSS-REFERENCE TO RELATED APPLICATIONS

This application is a continuation of U.S. application Ser. No. 15/025,151, filed Mar. 25, 2016, currently pending, which in turn is a U.S. National Stage filing under 35 U.S.C. § 371 of International Application No. PCT/JP2014/075426, filed Sep. 25, 2014, which in turn claims priority to Japanese Patent Application No. 2013-202295, filed Sep. 27, 2013, and also to Japanese Patent Application No. 2013-202296, filed Sep. 27, 2013, the entire contents of which are incorporated by reference herein.

TECHNICAL FIELD

The present invention relates to a method for efficiently degrading a biodegradable resin.

BACKGROUND ART

Biodegradable resins such as polylactic acid-based resins are finding increasing applications, including applications to packaging materials, applications to mulching films for the agricultural field, applications to the well drilling method for mining underground resources, and the like. With this trend, development of technologies to meet various applications has been demanded such as improvement in biodegradable resin degradation rate and development of a degradation trigger or degradation rate controlling technology. The rotary drilling method is a method in which the drilling is achieved with a drill, while muddy water is being circulated. In this method, a kind of filter membrane called mud cake is formed by using a fluid-loss-control agent as a finishing fluid. Thus, the wall of the well is kept stable to prevent collapse, and the friction is reduced. Meanwhile, in the hydraulic fracturing method, a fluid with which a well is filled is pressurized to a high pressure to form fractures in the vicinity of the well. Thus, the penetrability (flowability of fluid) in the vicinity of the well is improved, and the effective cross-section thorough which a resource such as oil or gas flows into the well is increased to increase the productivity of the well.

In the case of the finishing fluid, in which calcium carbonate or a granulated salt is mainly used as the fluid-loss-control agent, an acid treatment is necessary to remove the fluid-loss-control agent, and the stratum of the well is clogged by the fluid-loss-control agent to cause production failure. In addition, the fluid used in the hydraulic fracturing method is also called a fracturing fluid, and viscous fluids such as gasoline gel had been used in the past. With the development of the shale gas produced from the shale stratum, which is present in a relatively shallow site, and the like, aqueous dispersions in which a polymer is dissolved or dispersed in water have been used recently considering the influence on the environment. Polylactic acid is known as such a polymer.

Specifically, polylactic acid is a substance which exhibits hydrolyzability and enzymatic degradability. Even when polylactic acid is left in the ground, the polylactic acid is degraded by water or enzymes in the ground. Hence, polylactic acid does not exert any adverse influence on the environment. In addition, it can be said that water used as the dispersion medium has almost no influence on the environment, when compared with gasoline or the like.

In addition, when a well is filled with such an aqueous dispersion of polylactic acid, and this aqueous dispersion is pressurized, the polylactic acid penetrates into the vicinity of the well. Then, the polylactic acid is hydrolyzed to lose the shape as a resin, and spaces (i.e., fractures) are formed in the portions into which the polylactic acid has penetrated. Accordingly, the spaces through which the resource flows into the well can be increased.

Further, polylactic acid also functions as a fluid-loss-control agent. Specifically, polylactic acid has a function of inhibiting excessive penetration of water used as the dispersion medium into the ground to minimize the environmental change in the stratum. Since polylactic acid is degraded in the ground, no acid treatment is necessary.

In addition, lactic acid, which is a degradation product of polylactic acid, is an organic acid. After degradation of polylactic acid, lactic acid is released, and this acid erodes shale in the shale stratum. Hence, lactic acid has a function of promoting the pore formation in the shale.

However, polylactic acid has a low hydrolysis rate below 100° C., although it is hydrolyzed relatively rapidly at a temperature of 100° C. or above. Accordingly, when polylactic acid is applied to mining of shale gas produced from a site in the ground where the temperature is low or the like, the efficiency is low, and an improvement has been required.

On the other hand, the use of polyglycolic acid instead of polylactic acid has been proposed. Also, polyglycolic acid is known as a biodegradable resin, and moreover has a higher hydrolyzability than polylactic acid. For example, polyglycolic acid has a much higher hydrolysis rate at a temperature of about 80° C. than polylactic acid. Accordingly, polyglycolic acid is effective as an alternative to polylactic acid.

However, there is such a problem that polyglycolic acid requires much higher costs than polylactic acid. This is a serious disadvantage in the hydraulic fracturing method in which the fracturing fluid is used in a large amount. In addition, under certain temperature conditions, sufficiently satisfactory degradability cannot be obtained.

To efficiently degrade a biodegradable resin, for example, a readily degradable resin composition has been developed whose biodegradability is improved by blending an aliphatic polyester that releases an acid upon hydrolysis (International Publication No. WO2008/038648). In addition, a method for degrading the above-described readily degradable resin composition and the like have been reported (Japanese Patent Application Publication No. 2010-138389). Further, a method for degrading a biodegradable resin in a solution by using any of various hydrolases has been reported (Japanese Patent Application Publication Nos. 2003-284550 and 2005-162832). However, there has been a demand for development of a technology for further improving the degradation rate of a biodegradable resin.

SUMMARY OF INVENTION

An object of the present invention is to provide a method for efficiently degrading a biodegradable resin.

The inventors of the present application have found that, when a biodegradable resin is degraded in a buffer solution, the biodegradable resin can be efficiently degraded by using a specific biodegradable resin-degrading enzyme and a specific buffer solution.

Specifically, a first aspect of the present invention provides a method for degrading a biodegradable resin, the method comprising degrading the biodegradable resin in a buffer solution containing a biodegradable resin-degrading enzyme having an optimum pH of 7.5 or higher, wherein no anion derived from a buffer component is present on one side of an equilibrium equation of buffering of the buffer solution, and a pH of the buffer solution is adjusted within a pH range which gives conditions for shifting the equilibrium towards the side on which no anion is present.

The inventors of the present application have further found that, when a biodegradable resin is degraded in a solution, a specific hydrolase has an optimum concentration (i.e., a degradation peak depending on the enzyme concentration) at which the degradation efficiency of the biodegradable resin reaches is maximized.

Specifically, a second aspect of the present invention provides a method for degrading a biodegradable resin, the method comprising degrading the biodegradable resin in an enzymatic reaction liquid containing a biodegradable resin-degrading enzyme having an optimum concentration, wherein the degradation is conducted in a reaction liquid having an enzyme concentration which gives a biodegradable resin degradation ratio of 60% or higher, where a biodegradable resin degradation ratio at said optimum concentration is referred to as 100%.

The present invention makes it possible to rapidly degrade a biodegradable resin.

DESCRIPTION OF EMBODIMENTS

Figure 1:
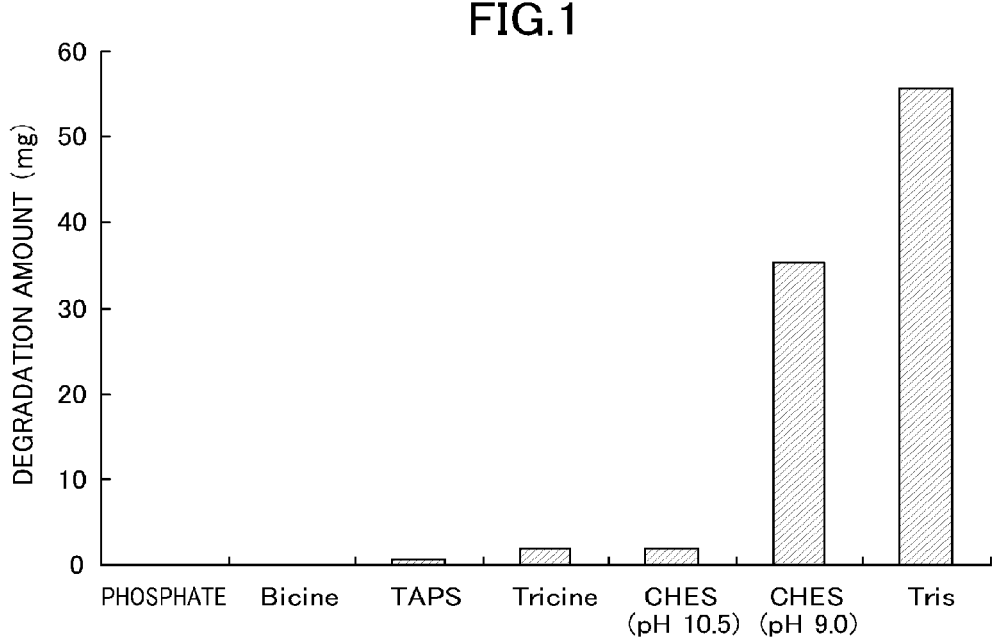
FIG. 1 shows results of degradation of a polylactic acid film by using buffer solutions of different types and different pHs.

1. A first aspect of the present invention provides a method for degrading a biodegradable resin, the method comprising degrading the biodegradable resin in a buffer solution containing a biodegradable resin-degrading enzyme having an optimum pH of 7.5 or higher, wherein no anion derived from a buffer component is present on one side of an equilibrium equation of buffering of the buffer solution, and a pH of the buffer solution is adjusted within a pH range which gives conditions for shifting the equilibrium towards the side on which no anion is present.

In the first aspect of the present invention, the biodegradable resin is not particularly limited, and an aliphatic polyester, which generally has biodegradability, or the like is used. Examples of the aliphatic polyester having biodegradability include polylactic acid-based resins, polybutylene succinate, polycaprolactone, polyhydroxybutyrate, polybutylene succinate adipate copolymer, copolymers of the above-described aliphatic polyesters, copolymers of an aromatic polyester such as polyethylene terephthalate, polyethylene naphthalate, or polybutylene terephthalate with any of the above-described aliphatic polyesters, and the like. One of these polyesters may be used alone, or two or more thereof may be used in combination.

Examples of components which form the above-described copolymers of the aliphatic polyesters include polyols such as ethylene glycol, propylene glycol, butanediol, octanediol, dodecanediol, neopentyl glycol, glycerin, pentaerythritol, sorbitan, bisphenol A, and polyethylene glycol; dicarboxylic acids such as succinic acid, adipic acid, sebacic acid, glutaric acid, decanedicarboxylic acid, cyclohexanedicarboxylic acid, terephthalic acid, isophthalic acid, and anthracenedicarboxylic acid; hydroxycarboxylic acids such as glycolic acid, L-lactic acid, D-lactic acid, hydroxypropionic acid, hydroxybutyric acid, hydroxyvaleric acid, hydroxycaproic acid, mandelic acid, and hydroxybenzoic acid; lactones such as glycolide, caprolactone, butyrolactone, valerolactone, propiolactone, and undecalactone; and the like.

Polymers which may be blended include cellulose, derivatives thereof, chitin, glycogen, chitosan, polyamino acids, starch, and the like. Note that, when polylactic acid is used, the lactic acid used for the polymerization may be either the L-isomer or the D-isomer or may be a mixture of the L-isomer and the D-isomer.

Preferred aliphatic polyesters having biodegradability include polylactic acid-based resins, polybutylene succinate, and the like, and polylactic acid-based resins are particularly preferable.

The molecular weight of the aliphatic polyester having biodegradability is not particularly limited, and the weight average molecular weight of the aliphatic polyester having biodegradability is preferably in a range from 5,000 to 1,000,000, and more preferably in a range from 10,000 to 500,000, considering the mechanical characteristics and processability in producing a container or the like by using a biodegradable resin containing the aliphatic polyester.

If necessary, known additives such as plasticizers, heat stabilizers, light stabilizers, antioxidants, ultraviolet absorbers, flame retardants, coloring agents, pigments, fillers, bulking agents, mold release agents, antistats, fragrances, lubricants, foaming agents, antibacterial/antifungal agents, and nucleating agents may be blended in the biodegradable resin to be degraded by the method of the first aspect of the present invention. In addition, a resin other than the aliphatic polyester having biodegradability may be blended, unless any effect of the present invention is impaired. For example, it is possible to blend water-soluble resins such as polyethylene glycol and polyvinyl alcohol, and also to blend polyethylene, polypropylene, ethylene-propylene copolymer, acid-modified polyolefin, ethylene-methacrylic acid copolymer, ethylene-vinyl acetate copolymer, ionomer resin, polyethylene terephthalate, polybutylene terephthalate, polyvinyl acetate, polyvinyl chloride, polystyrene, polyester rubber, polyamide rubber, styrene-butadiene-styrene copolymer, and the like.

Note that, to improve the degradability of the above-described enzymatically degradable resin, an ester degradation-promoting hydrolyzable resin (hereinafter, simply abbreviated as "ester-degrading resin" in some cases) may be blended in the enzymatically degradable resin.

This ester-degrading resin does not exhibit any ester-degrading ability when the ester-degrading resin is present alone, but the ester-degrading resin releases an acid or an alkali which functions as an ester-degrading catalyst upon mixing with water.

In general, the ester-degrading resin is dispersed uniformly in an inner portion of the above-described hydrolyzable resin, which has a low hydrolyzability, and the acid or alkali released from the ester-degrading resin promotes rapid hydrolysis of the hydrolyzable resin. In this respect, for example, an ester-degrading resin having a weight average molecular weight of about 1000 to 200000 is used as the ester-degrading resin.

In addition, for alkali-releasing ones of the ester-degrading resins, sodium alginate, an alkali metal acrylate such as sodium acrylate, or the like can be used. However, the release of an alkali has a large negative impact on the environment. Hence, acid-releasing ones are particularly preferably used.

As the acid-releasing ester-degrading resin, it is particularly preferable to use a polymer which exhibits a pH (at 25° C.) of 4 or lower, and particularly preferably 3 or lower in an aqueous solution or aqueous dispersion at a concentration of 0.005 g/ml, and which is easily hydrolyzed upon mixing with water and releases the acid.

Examples of the above-described polymers include polyoxalates, polyglycolic acid, and the like. These polymers may be copolymers. Alternatively, one of these polymers may be used alone, or two or more thereof may be used in combination.

Examples of components which form the copolymers include polyols such as ethylene glycol, propylene glycol, butanediol, octanediol, dodecanediol, neopentyl glycol, glycerin, pentaerythritol, sorbitan, bisphenol A, and polyethylene glycol; dicarboxylic acids such as succinic acid, adipic acid, sebacic acid, glutaric acid, decanedicarboxylic acid, cyclohexanedicarboxylic acid, terephthalic acid, isophthalic acid, and anthracenedicarboxylic acid; hydroxycarboxylic acids such as glycolic acid, L-lactic acid, D-lactic acid, hydroxypropionic acid, hydroxybutyric acid, hydroxyvaleric acid, hydroxycaproic acid, mandelic acid, and hydroxybenzoic acid; lactones such as glycolide, caprolactone, butyrolactone, valerolactone, propiolactone, and undecalactone; and the like.

Note that, in this Description, a polymer, such as a homopolymer, a copolymer, or a blend, in which oxalic acid is polymerized as at least one monomer is referred to as a polyoxalate.

The above-described polyoxalates and polyglycolic acid are readily hydrolyzable resins, and are hydrolyzed rapidly. For this reason, the above-described polyoxalates and polyglycolic acid are especially excellent in hydrolysis acceleration ability of hardly hydrolyzable resins. Of these, polyoxalates, especially polyethylene oxalate, exhibit a remarkably higher hydrolysis acceleration ability than polyglycolic acid, and are capable of remarkably accelerating the hydrolysis of the hardly hydrolyzable resin such as polylactic acid even at a temperature of 80° C. or below. Moreover, polyoxalates are much more inexpensive than polyglycolic acid and are extremely advantageous in terms of costs.

The biodegradable resin degraded by the method of the first aspect of the present invention may be in a form of a pellet, a film, a powder, a single-layer fiber, a core-sheath fiber, a capsule, or the like. However, the form is not limited thereto, and the biodegradable resin can be produced by a method known per se.

The biodegradable resin-degrading enzyme used in the first aspect of the present invention is not particularly limited, as long as the biodegradable resin-degrading enzyme has an optimum pH of 7.5 or higher and generally degrades a biodegradable resin. A person skilled in the art can use any biodegradable resin-degrading enzyme. The optimum pH of the above-described enzyme is more preferably 8.0 or higher, and further preferably 8.5 or higher. The enzyme is preferably an alkaline protease, an alkaline cellulase, an esterase, a cutinase, a lipase, or the like, and, for example, Savinase manufactured by Novozymes can be used. The amount of the enzyme can be determined, as appropriate, by a person skilled in the art, and the amount of the enzyme can be determined, for example, according to the type of the biodegradable resin to be degraded and the like on the basis of the activity unit specific to the enzyme used.

The buffer solution used in the first aspect of the present invention is such that no anion derived from a buffer component is present on one side of an equilibrium equation of buffering of the buffer solution, and a pH of the buffer solution is adjusted within a pH range which gives conditions for shifting the equilibrium towards the side on which no anion is present. Such buffer solutions include those containing, for example, a tris-hydrochloride buffer solution (tris aminomethane), a 2-(cyclohexylamino) ethanesulfonic acid (CHES) buffer solution, a Good's buffer solution such as a Bis-Tris buffer solution, a MOPS buffer solution, or a HEPES buffer solution as a buffer component. The above-described buffer solution is used, while being adjusted within the pH range which gives conditions for shifting the equilibrium towards the side on which no anion is present. In addition, on the premise that the above-described pH condition is satisfied, the pH of the buffer solution is further preferably 7.5 or higher, more preferably 8.0 or higher, and particularly preferably 8.5 or higher, 9.0 or higher, 9.5 or higher, or 10.0 or higher.

In the first aspect of the present invention, the phrase "a pH range which gives conditions for shifting the equilibrium towards the side on which no anion (derived from the buffer component) is present" does not completely exclude the presence of the anion derived from the buffer component in the buffer solution. Typically, based on the pKa value of the equilibrium (according to the equilibrium equation), the pH range which gives conditions for shifting the equilibrium towards the side on which no anion is present can be determined to be a range which is above or below the pKa value. As long as the above-described conditions are satisfied, the pH of the buffer solution may be out of the buffering pH range.

For example, when a tris-hydrochloride buffer solution (tris aminomethane) (pKa=8.06) (see Example 1-1 described later) is used as the buffer solution, the pH can be higher than 8.06, and, for example, the pH can be 8.5 or higher, 9.0 or higher, 10.0 or higher, 10.5 or higher, or the like. Likewise, when a CHES buffer solution (pKa=9.3) (see Example 1-2 described later) is used, the pH can be lower than 9.3, and, for example, the pH can be 9.0 or lower, 8.5 or lower, 8.0 or lower, or the like. Considering the active pH range of the enzyme, the lower limit of the pH of the buffer solution is preferably 7.5 or higher, 8.0 or higher, 8.5 or higher, or the like.

In addition, a person skilled in the art can determine, as appropriate, the concentration of the buffer solution, and a buffer solution can be used which has, for example, a salt concentration of 10 mM to 200 mM, and preferably 50 mM to 150 mM.

Further, conditions such as the time and the temperature for degrading the biodegradable resin in the buffer solution can be determined, as appropriate, by a person skilled in the art according to the types and amounts of the enzyme and biodegradable resin used.

2. Meanwhile, a second aspect of the present invention provides a method for degrading a biodegradable resin, the method comprising degrading the biodegradable resin in an enzymatic reaction liquid containing a biodegradable resin-degrading enzyme having an optimum concentration, wherein the degradation is conducted in a reaction liquid having an enzyme concentration which gives a biodegradable resin degradation ratio of 60% or higher, where a biodegradable resin degradation ratio at said optimum concentration is referred to as 100%.

The biodegradable resin used in the second aspect of the present invention is not particularly limited, and an aliphatic polyester, which generally has biodegradability, or the like is used, as in the case of the above-described first aspect of the present invention. The same aliphatic polyesters as those described above in the first aspect of the present invention can be used in terms of all the points including the specific types of the aliphatic polyesters, the usable components forming the copolymers, the usable additives, the usable ester-degrading resins, the employable forms, and the like.

In general, the biodegradable resin-degrading enzyme used in the second aspect of the present invention is not particularly limited, as long as the biodegradable resin-degrading enzyme has an optimum concentration (i.e., a degradation peak which depends on the enzyme concentration) at which the degradation efficiency of a biodegradable resin in a solution is maximized. A person skilled in the art can find, as appropriate, the above-described biodegradable resin-degrading enzyme by a test or the like. For example, alkaline proteases generally have optimum concentrations for the biodegradable resin-degrading activity. In the second aspect of the present invention, Savinase, Esperase, or the like can be used preferably. In addition, the optimum pH of the biodegradable resin-degrading enzyme used in the second aspect of the present invention is preferably 7.5 or higher, more preferably 8.0 or higher, and further preferably 8.5 or higher.

As the enzyme concentration in the reaction liquid used in the method for degrading a biodegradable resin of the second aspect of the present invention, an enzyme concentration is employed which gives a biodegradable resin degradation ratio of 60% or higher, preferably 70% or higher, more preferably 80% or higher, and particularly preferably 90% or higher, where a biodegradable resin degradation ratio at the optimum concentration at which the degradation of the biodegradable resin is maximized is referred to as 100%. The optimum concentration can be determined experimentally by actually degrading a biodegradable resin in multiple reaction liquids having different enzyme concentrations. In the second aspect of the present invention, the optimum concentration of an enzyme for the biodegradable resin to be degraded is preferably determined based on the enzyme concentration per unit surface area of the biodegradable resin which has not been degraded. It is possible to experimentally determine the enzyme concentration at which the degradation ratio of the biodegradable resin in the reaction liquid designated in the present application is maximized can be determined according to the surface area of the biodegradable resin having any weight and any shape such as a film, a pellet, or a powder.

Regarding the surface area of the biodegradable resin, when the biodegradable resin is in the form of a film, a surface area calculated based on the two-dimensional sizes of the top and bottom of the film can be used for convenience. Meanwhile, for a pellet, a powder, a single-layer fiber, a core-sheath fiber, a capsule, or the like, a surface area determined by surface area calculation based on the permeation method, the gas adsorption method, or the size-measuring can be employed.

The buffer solution used in the second aspect of the present invention is not particularly limited, as long as the buffer solution is generally used for the purpose of stabilizing the pH. Such buffer solutions include a glycine-hydrochloride buffer solution, a phosphate buffer solution, a tris-hydrochloric acid (tris aminomethane) buffer solution, a 2-(cyclohexylamino) ethanesulfonic acid (CHES) buffer solution, an acetate buffer solution, a citrate buffer solution, a citrate-phosphate buffer solution, a borate buffer solution, a tartrate buffer solution, a glycine-sodium hydroxide buffer solution, and the like. In addition, a solid neutralizing agent may be used, and examples thereof include calcium carbonate, chitosan, deprotonation ion-exchange resins, and the like. In the second aspect of the present invention, a buffer solution having a buffer capacity in a pH range from 7 to 12 is preferable, and it is more preferable to use a buffer solution having a buffer capacity in a pH range from 8 to 11, and further preferably 8.5 to 10.5. In the second aspect of the present invention, a tris-hydrochloric acid (tris aminomethane) buffer solution and 2-(cyclohexylamino) ethanesulfonic acid (CHES) buffer solution are preferable, and a 2-(cyclohexylamino) ethanesulfonic acid (CHES) buffer solution is particularly preferable.

The pH of the buffer solution can be determined, as appropriate, by a person skilled in the art according to the type of the enzyme used and the like, and is preferably 7.5 or higher, more preferably 8.0 or higher, and particularly preferably 8.5 or higher, 9.0 or higher, 9.5 or higher, or 10.0 or higher.

In addition, a person skilled in the art can determine the concentration of the buffer solution, as appropriate. For example, a buffer solution having a salt concentration of 10 mM to 200 mM and preferably 50 mM to 150 mM can be used.

Further, conditions such as the time and the temperature for degrading the biodegradable resin in the buffer solution can be determined by a person skilled in the art, as appropriate, according to the types and amounts of the enzyme and the biodegradable resin used.

EXAMPLES

Hereinafter, the present invention is described specifically based on Examples.

1. Enzymatic Degradation Test on Biodegradable Film According to First Aspect of Present Invention Degradation liquids were prepared by adding 100 μL of a Savinase enzyme liquid to 30 ml of each of buffer solutions prepared at 100 mM with a pH of 10.5 (only CHES buffer solutions were prepared with pHs of 9.0 and 10.5). Pieces cut out of a polylactic acid film in a size of 2 cm×2 cm (120 mg) were immersed in the degradation liquids, followed by shaking at 45° C. and at 100 rpm for 16 hours. The pieces of the film were taken out 16 hours later, and dried at 70° C. for 3 hours. The degradation amounts were determined as follows:

Initial weight of film−weight after degradation=degradation amount (mg).

Preparation of Polylactic Acid Film

The polylactic acid film was formed from polylactic acid (manufactured by NatureWorks LLC) by using Labo Plastomill (manufactured by Toyo Seiki Seisaku-sho, Ltd.) at 210° C. The polylactic acid film had a thickness of 100 μm.

A biodegradable resin-degrading enzyme used was as follows:

Savinase Enzyme Liquid

Savinase 16.0 L (Novozymes) was used.

The following buffer solutions were used.

(i) Tris buffer solution (7.0 to 9.0; pKa=8.06)

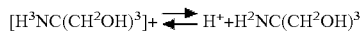

(ii) CHES buffer solutions (8.6 to 10.0; pKa=9.3)

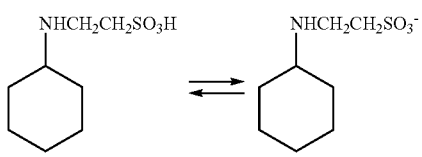

(iii) Phosphate buffer solution (5.8 to 8.0; pKa1=2.12, pKa2=7.21, pKa3=12.67)

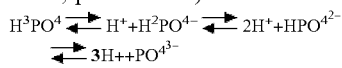

(iv) Bicine buffer solution (7.0 to 9.0; pKa=8.06)

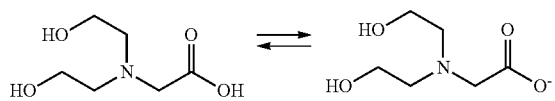 [SMILES: O=C(O)CN(CCO)CCO ; O=C([O-])CN(CCO)CCO]

(v) TAPS buffer solution (7.5 to 9.4; pKa=8.44)

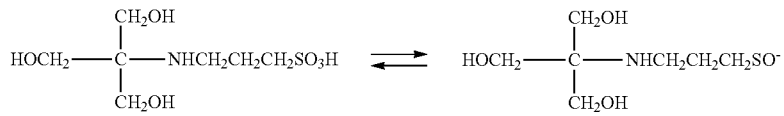

(vi) Tricine buffer solution (7.2 to 9.1; pKa1=2.3, pKa2=8.15)

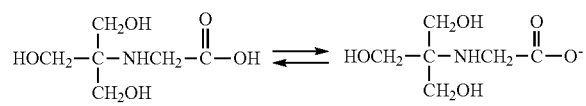

Regarding the (ii) CHES buffer solutions described above, two solutions with pHs of 9.0 and 10.5 were prepared, and the pHs of the other buffer solutions used were adjusted to 10.5.

Example 1-1

A degradation liquid was prepared by adding 100 μL of the Savinase enzyme liquid to 30 ml of the Tris buffer solution prepared at 100 mM with a pH of 10.5. A piece cut out of the polylactic acid film in a size of 2 cm×2 cm (120 mg) was immersed in the degradation liquid, followed by shaking at 45° C. and at 100 rpm for 16 hours. The film was taken out 16 hours later, and dried at 70° C. for 3 hours. The degradation amount was determined as follows:

Initial weight of film−Weight after degradation=Degradation amount (mg).

Example 1-2

Example 1-2 was conducted in the same manner as in Example 1-1, except that the CHES buffer solution prepared at 100 mM with a pH of 9.0 was used as the buffer solution.

Comparative Example 1-1

Comparative Example 1-1 was conducted in the same manner as in Example 1-1, except that the phosphate buffer solution was used as the buffer solution.

Comparative Example 1-2

Comparative Example 1-2 was conducted in the same manner as in Example 1-1, except that the Bicine buffer solution was used as the buffer solution.

Comparative Example 1-3

Comparative Example 1-3 was conducted in the same manner as in Example 1-1, except that the TAPS buffer solution was used as the buffer solution.

Comparative Example 1-4

Comparative Example 1-4 was conducted in the same manner as in Example 1-1, except that a Tricine buffer solution was used as the buffer solution.

Comparative Example 1-5

Comparative Example 1-5 was conducted in the same manner as in Example 1-2, except that the pH of the CHES buffer solution was adjusted to 10.5.

The results of the degradation of the polylactic acid film in Examples 1-1 and 1-2 and Comparative Examples 1-1 to 1-5 are shown in Table 1 below and FIG. 1.

From these results, it can be understood that the polylactic acid film was degraded at a high level in each of Examples 1-1 and 1-2 in which the buffer solutions designated in the present application were used.

TABLE 1

|  | Type of buffer solution | pH of buffer solution | Weight loss amount (mg) |
| --- | --- | --- | --- |
| Example 1-1 | Tris | 10.5 | 55.65 |
| Example 1-2 | CHES | 9.0 | 35.37 |
| Comp. Ex. 1-1 | Phosphoric acid | 10.5 | 0 |
| Comp. Ex. 1-2 | Bicine | 10.5 | 0.08 |
| Comp. Ex. 1-3 | TAPS | 10.5 | 0.72 |
| Comp. Ex. 1-4 | Tricine | 10.5 | 1.89 |
| Comp. Ex. 1-5 | CHES | 10.5 | 2.00 |

2. Enzymatic Degradation Test on Biodegradable Film According to Second Aspect of Present Invention Pieces cut out of a polylactic acid film in a size of 2 cm×2 cm (120 mg) were immersed in degradation liquids prepared by adding a Savinase, Esperase, or Proteinase K enzyme liquid to 30 ml of a 100 mM CHES buffer solution (pH 9.0), followed by shaking at 45° C. and at 100 rpm for 16 hours. The pieces of the film were taken out 16 hours later, and dried at 70° C. for 3 hours. The degradation amounts were determined as follows:

Initial weight of film−weight after degradation=degradation amount (mg).

A graph was made in which the degradation amount per unit area, which was equal to the degradation amount (mg) divided by the initial surface area (8 cm²) of the film, was plotted on the vertical axis and the initial amount of enzyme added per unit area, which was equal to the initial enzyme concentration (mg/mL) divided by the initial surface area (8 cm²) of the film, was plotted on the horizontal axis. Enzymes which had an optimum concentration were marked with ○, and the other enzyme was marked with x. In addition, concentrations at which a degradation amount of 60% or higher was observed were marked with ○, and concentrations at which a degradation amount less than 60% was observed were marked with x, where the degradation amount at the optimum concentration was taken as 100%.

Preparation of Polylactic Acid Film

The polylactic acid film was formed from polylactic acid (manufactured by NatureWorks LLC) by using Labo Plastomill (manufactured by Toyo Seiki Seisaku-sho, Ltd.) at 210° C. The polylactic acid film had a thickness of 100 μm.

The biodegradable resin-degrading enzymes used were as follows.

(i) Savinase Enzyme Liquid

Savinase 16.0 L (Novozymes) was used.

(ii) Esperase Enzyme Liquid

Esperase 8.0 L (Novozymes) was used.

(iii) Pro K (Proteinase K) Enzyme Solution

In 1 ml of 0.05 M Tris-HCl buffer solution (pH 8.0) containing 50 w/w % glycerin, 20 mg of Tritirachium album-derived Proteinase K powder was dissolved. The pro K (Proteinase K) enzyme solution thus prepared was used.

Example 2-1

A piece cut out of the polylactic acid film in a size of 2 cm×2 cm (120 mg) was immersed in 30 ml of a 100 mM. CHES buffer solution (pH 9.0) to which 50 μl of the Savinase enzyme liquid was added, followed by shaking at 45° C. and at 100 rpm for 16 hours. The film was taken out 16 hours later, and dried at 70° C. for 3 hours. The degradation amount was determined as follows:

Initial weight of film−weight after degradation=degradation amount (mg).

Examples 2-2 to 2-6 and Comparative Examples 2-1 to 2-18

Enzymatic degradation tests were carried out by employing the same buffer solution, lactic acid film, and degradation conditions as those in Example 2-1, and changing the enzyme solution and the amount of the enzyme solution as shown in Table 2 below.

Figure 2:
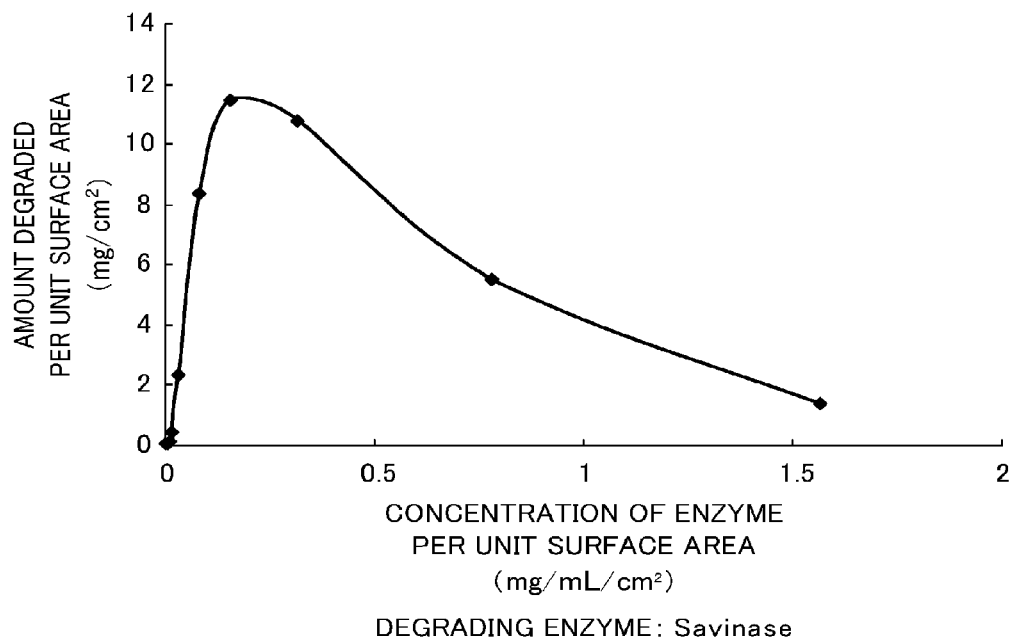
FIG. 2 shows a degradation curve of a polylactic acid film with Savinase.
Figure 3:
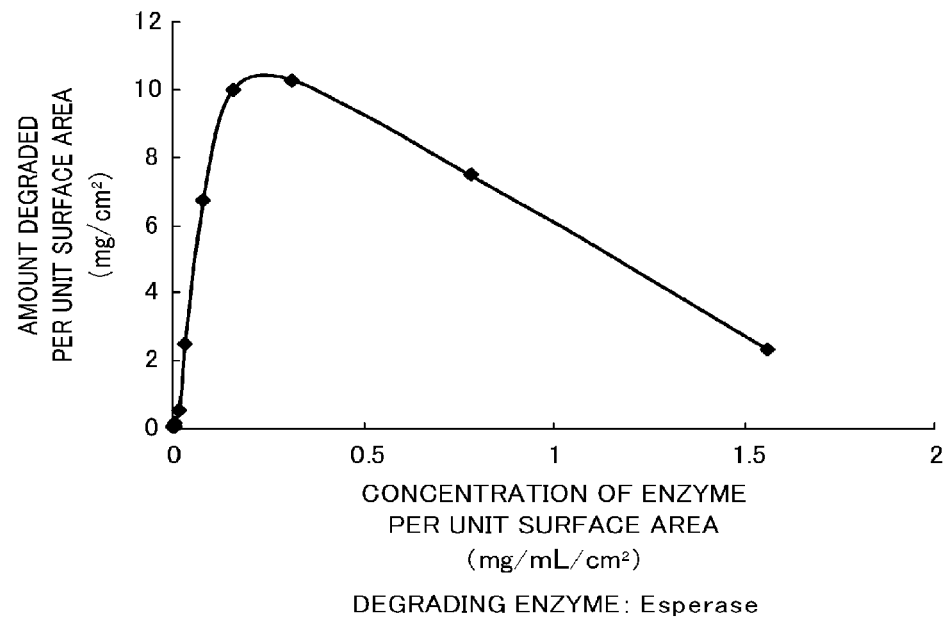
FIG. 3 shows a degradation curve of a polylactic acid resin with Esperase.
Figure 4:
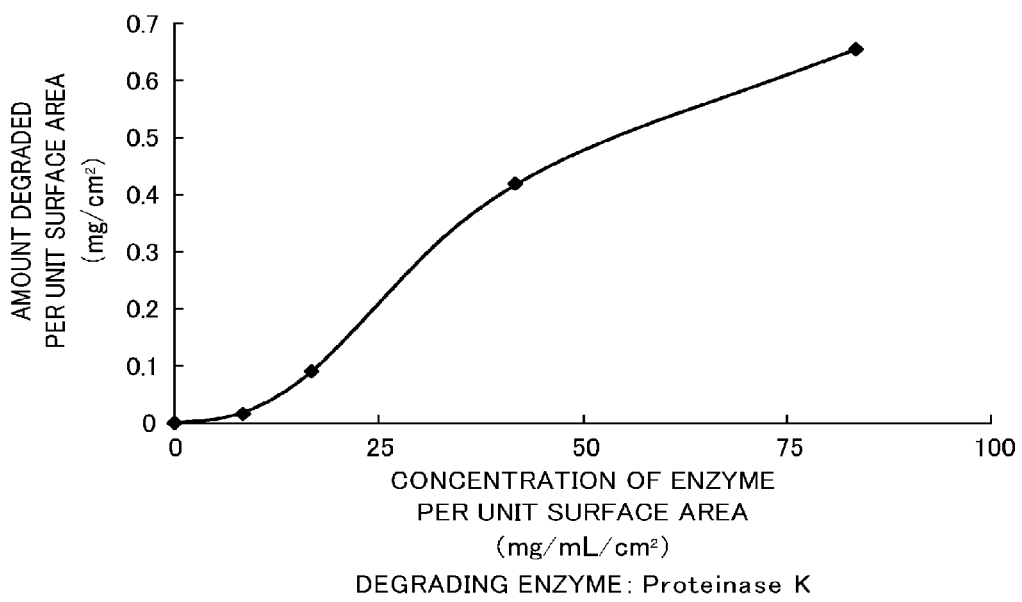
FIG. 4 shows a degradation curve of the polylactic acid resin with Proteinase K.

Table 2 below and FIGS. 2 to 4 show the test conditions in the Examples and Comparative Examples, and the results of the degradation tests.

TABLE 2

|  | Presence/absence of optimum concentration | Amount of enzyme added to degradation liquid (μL) | Concentration of enzyme per unit area (mg/mL/cm²) | Weight loss amount (mg) | Degradation ratio relative to degradation amount at optimum concentration (%) |
| --- | --- | --- | --- | --- | --- |
| Example 2-1 | ○ | Savinase 50 μL | 0.078 | 8.36 | 72.99 |
| Example 2-2 | ○ | Savinase 100 μL | 0.156 | 11.45 | 100 |
| Example 2-3 | ○ | Savinase 200 μL | 0.313 | 10.76 | 93.95 |
| Example 2-4 | ○ | Esperase 50 μL | 0.078 | 6.75 | 65.65 |
| Example 2-5 | ○ | Esperase 100 μL | 0.156 | 9.98 | 97.09 |
| Example 2-6 | ○ | Esperase 200 μL | 0.313 | 10.28 | 100 |
| Example 2-7 | ○ | Esperase 500 μL | 0.781 | 7.5 | 72.99 |
| Comp. Ex. 2-1 | ○ | Savinase 1 μL | 0.002 | 0.06 | 0.53 |
| Comp. Ex. 2-2 | ○ | Savinase 2 μL | 0.003 | 0.07 | 0.58 |
| Comp. Ex. 2-3 | ○ | Savinase 5 μL | 0.008 | 0.13 | 1.15 |
| Comp. Ex. 2-4 | ○ | Savinase 10 μL | 0.016 | 0.46 | 4.03 |
| Comp. Ex. 2-5 | ○ | Savinase 20 μL | 0.031 | 2.35 | 20.49 |
| Comp. Ex. 2-6 | ○ | Savinase 500 μL | 0.781 | 5.5 | 48.11 |
| Comp. Ex. 2-7 | ○ | Savinase 1000 μL | 1.563 | 1.39 | 12.14 |
| Comp. Ex. 2-8 | ○ | Esperase 1 μL | 0.002 | 0.05 | 0.46 |
| Comp. Ex. 2-9 | ○ | Esperase 2 μL | 0.003 | 0.06 | 0.55 |
| Comp. Ex. 2-10 | ○ | Esperase 5 μL | 0.008 | 0.16 | 1.57 |
| Comp. Ex. 2-11 | ○ | Esperase 10 μL | 0.016 | 0.56 | 5.45 |
| Comp. Ex. 2-12 | ○ | Esperase 20 μL | 0.031 | 2.52 | 24.47 |
| Comp. Ex. 2-13 | ○ | Esperase 1000 μL | 1.562 | 2.36 | 22.96 |
| Comp. Ex. 2-14 | x | Proteinase K 1 μL | 0.083 | 0.0002 | — |
| Comp. Ex. 2-15 | x | Proteinase K 100 μL | 8.33 | 0.02 | — |
| Comp. Ex. 2-16 | x | Proteinase K 200 μL | 16.67 | 0.09 | — |
| Comp. Ex. 2-17 | x | Proteinase K 500 μL | 41.67 | 0.42 | — |
| Comp. Ex. 2-18 | x | Proteinase K 1000 μL | 33.33 | 0.66 | — |

As can be understood from FIGS. 2 and 3, each of Savinase and Esperase, which are degrading enzymes designated in the second aspect of the present application, has an optimum concentration at which the degradation of the biodegradable resin is maximized when the enzyme concentration per unit surface area is varied. In contrast, the enzyme Proteinase K, which conventional degradation methods mainly employ, has no optimum concentration at which the degradation of the biodegradable resin is maximized, as shown in FIG. 4. In addition, even when a biodegradable resin-degrading enzyme having an optimum concentration is used in a conventional case, the presence of the degradation peak based on the enzyme concentration per unit surface area of a biodegradable resin has not been recognized, and the degradation has been conducted under enzyme concentration conditions where a high degree of degradation cannot be achieved. In the second aspect of the present invention, it has been found that the property of a specific enzyme to have an optimum concentration can be utilized for improvement of degradation ratio under conditions for degrading a biodegradable resin in a buffer solution.

The invention claimed is:

1. A method for degrading a biodegradable resin, the method comprising degrading the biodegradable resin in an enzymatic reaction liquid containing a biodegradable resin-degrading enzyme having an optimum concentration, wherein the degradation is conducted in a reaction liquid having an enzyme concentration which gives a biodegradable resin degradation ratio of 60% or higher, where a biodegradable resin degradation ratio at said optimum concentration is referred to as 100%.

2. The method according to claim 1, wherein the biodegradable resin-degrading enzyme is an alkaline protease.

3. The method according to claim 1, wherein the biodegradable resin comprises a polylactic acid-based resin.

4. The method according to claim 1, wherein the biodegradable resin is in a form of a pellet, a film, a powder, a single-layer fiber, a core-sheath fiber, or a capsule.

* * * * *